United States Patent
Faradjev et al.

(10) Patent No.: US 7,660,331 B1
(45) Date of Patent: Feb. 9, 2010

(54) METHOD AND APPARATUS FOR ALIGNING COMMUNICATION SIGNALS

(75) Inventors: Igor Faradjev, Campbell, CA (US); Natan Malkin, San Jose, CA (US); Liba Malkin, legal representative, San Jose, CA (US); Elizaveta K. Tavastcherna, San Jose, CA (US)

(73) Assignee: Spirent Communications, Rockville, MD (US)

( * ) Notice: Subject to any disclaimer, the term of this patent is extended or adjusted under 35 U.S.C. 154(b) by 591 days.

(21) Appl. No.: 11/609,863

(22) Filed: Dec. 12, 2006

Related U.S. Application Data

(60) Provisional application No. 60/749,861, filed on Dec. 12, 2005.

(51) Int. Cl.
*H04J 3/06* (2006.01)
*H04L 27/00* (2006.01)
*H04L 7/00* (2006.01)

(52) U.S. Cl. .................. 370/503; 375/259; 375/354

(58) Field of Classification Search .............. 370/503, 370/485, 395, 487, 516, 441, 442, 478–480, 370/204, 509, 342, 335; 455/11, 67; 375/376, 375/259, 354, 371, 265, 222, 233, 219, 326, 375/261, 344; 714/769
See application file for complete search history.

(56) References Cited

U.S. PATENT DOCUMENTS

| 5,991,308 | A  | * | 11/1999 | Fuhrmann et al. | 370/395.53 |
| 6,356,555 | B1 | * | 3/2002 | Rakib et al. | 370/441 |
| 7,584,402 | B2 | * | 9/2009 | Lapstun et al. | 714/769 |
| 2001/0033611 | A1 | * | 10/2001 | Grimwood et al. | 375/219 |
| 2001/0046266 | A1 | * | 11/2001 | Rakib et al. | 375/259 |
| 2003/0156603 | A1 | * | 8/2003 | Rakib et al. | 370/485 |
| 2006/0040616 | A1 | * | 2/2006 | Wheatley | 455/67.11 |

* cited by examiner

*Primary Examiner*—Hong Cho
*Assistant Examiner*—Prenell P Jones
(74) *Attorney, Agent, or Firm*—Martine Penilla & Gencarella, LLP

(57) ABSTRACT

A pilot signal is prepended to a communication signal to form a test signal. The test signal is transmitted through a communication network and received from the communication network. A temporal marker in the pilot signal portion of the received test signal is identified. The communication signal portion of the received test signal is known to begin at a specified time following the temporal marker. Using the identified temporal marker and the specified time, a beginning of the communication signal portion is identified within the received test signal. The identified beginning of the communication signal portion in the received test signal is then aligned with a beginning of an undegraded version of the communication signal.

20 Claims, 7 Drawing Sheets

METHOD AND APPARATUS FOR ALIGNING COMMUNICATION SIGNALS

CROSS-REFERENCE TO RELATED APPLICATIONS

This application claims the benefit of U.S. Provisional Application No. 60/749,861, filed Dec. 12, 2005.

BACKGROUND

A number of testing protocols have been established to diagnose speech quality degradation issues in communication systems. These testing protocols have been compiled by the International Telecommunication Union (ITU) into a number of standards. For example, two standards often used in diagnosing speech quality issues include ITU Standard P.861 and ITU Standard P.862. The speech quality tests prescribed in the above-mentioned standards require transmission of a voice pattern through a communication network and evaluation of the degradation within the voice pattern as received from the communication network.

Evaluation of the voice pattern degradation involves comparison of the degraded voice pattern with an undegraded version of the voice pattern. However, before the comparison can be made, the degraded and undegraded voice patterns need to be properly aligned. To facilitate this alignment in view of potential degradation within the received voice pattern, the standards recommend applying a cross-correlation function to the degraded and undegraded voice patterns to determine an amount of offset adjustment necessary to obtain the best alignment.

Application of the cross-correlation function to facilitate voice pattern alignment is expensive in terms of computational resources and time. Therefore, when performing speech quality testing on a number of channels within a communication network, performance of the cross-correlation function to align the voice patterns can become a bottleneck in the testing process.

SUMMARY

In one embodiment, a method is disclosed for aligning communication signals for testing of a communication network. The method includes prepending a pilot signal to a communication signal. The pilot signal and communication signal are then transmitted through a communication network and received from the communication network. The method further includes identifying a temporal marker in the received pilot signal. The communication signal is known to begin at a specified time following the temporal marker. Using the identified temporal marker and the specified time, a beginning of the received communication signal is identified. The method then includes aligning the beginning of the received communication signal with a beginning of an undegraded version of the communication signal.

In another embodiment, a method is disclosed for aligning communication signals for testing of a communication network. In this method, a test signal is generated, transmitted through a communication network, and received from the communication network. The generated test signal includes a pilot signal portion and a communication signal portion. The pilot signal portion precedes the communication signal portion within the test signal. Also, the pilot signal portion includes a temporal marker that precedes a beginning of the communication signal portion by a known amount of time. The method also includes identifying the temporal marker in the pilot signal portion of the received test signal. The beginning of the communication signal portion within the received test signal is then identified as residing at a temporal location following the identified temporal marker by the known amount of time. The method further includes aligning the beginning of the communication signal portion within the received test signal with a beginning of an undegraded version of the communication signal portion.

In another embodiment, a system is disclosed for aligning communication signals for testing of a communication network. The system includes a transmitting device and a receiving device. The transmitting device is defined to prepend a pilot signal to a communication signal to generate a test signal. The transmitting device is further defined to transmit the test signal through a communication network. The receiving device is defined to receive the test signal from the communication network. The receiving device is also defined to identify a temporal marker within the pilot signal of the received test signal. The communication signal is known to begin within the received test signal at a specified time following the temporal marker. The receiving device is further defined to use the temporal marker and the specified time to identify a beginning of the communication signal within the received test signal, and align the beginning of the communication signal within the received test signal with a beginning of an undegraded version of the communication signal.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
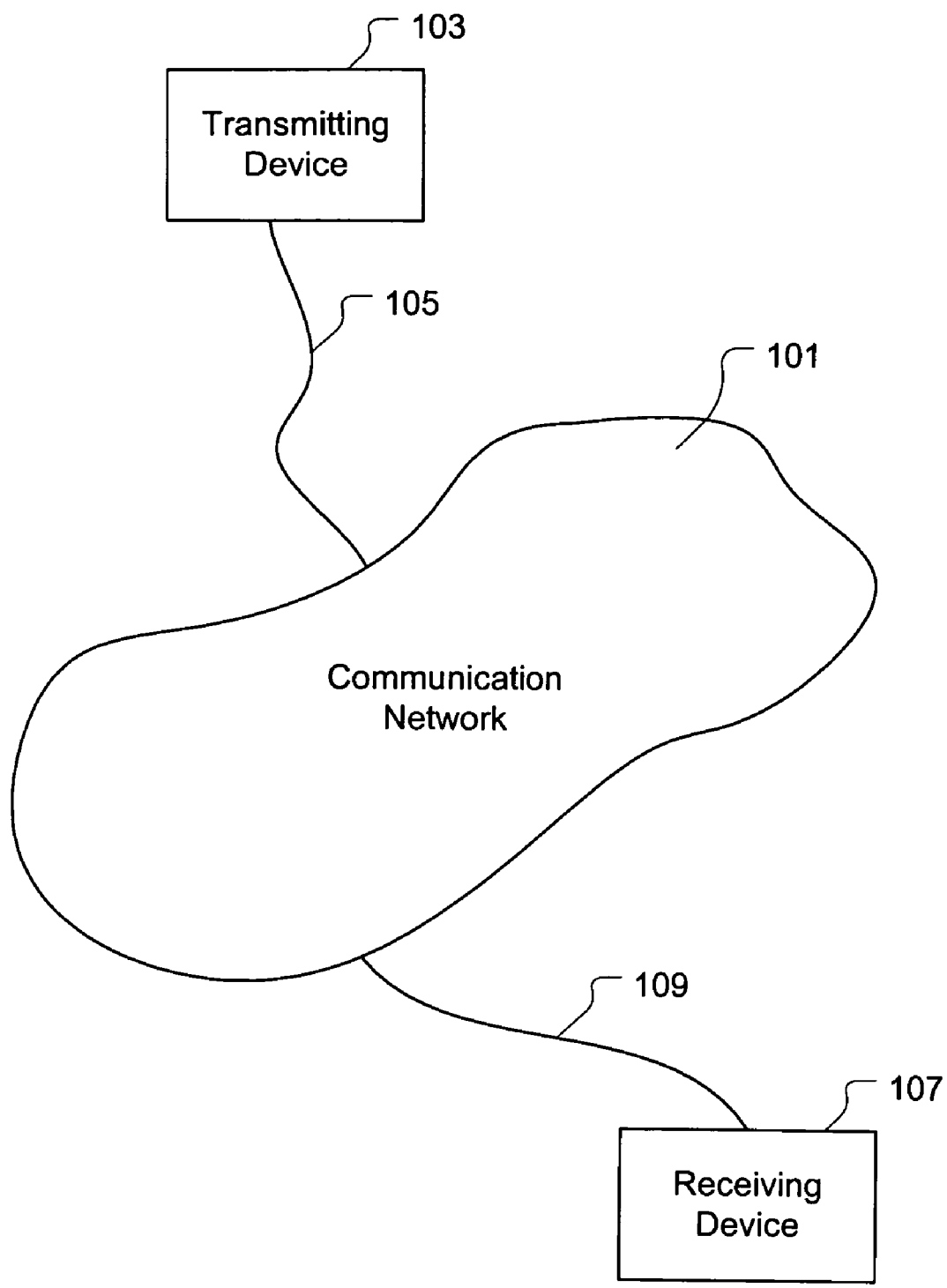
FIG. 1 is an illustration showing a communication system, in accordance with one embodiment of the present invention.

FIG. 1 is an illustration showing a communication system, in accordance with one embodiment of the present invention. The communication system includes a transmitting device 103, a communication network 101, and a receiving device 107. The transmitting device is capable of communicating with the communication network 101 through a connection 105. Also, the receiving device 107 is capable of communicating with the communication network 101 through a connection 109.

In one embodiment, each of the transmitting device 103 and the receiving device 107 is represented by a telephone and the communication network 101 is defined as a network configured to provide telephony services. In this embodiment, the quality of voice communication from the transmitting device 103 to the receiving device 107 can be affected in many ways. For example, if the speech quality associated with the voice communication from the transmitting device 103 is degraded by the communication network 101, the person hearing the voice communication at the receiving device 107 may not be able to understand the voice communication.

A number of testing protocols have been established to diagnose speech quality degradation issues in communication systems. These testing protocols have been compiled by the International Telecommunication Union (ITU) into a number of standards. For example, two standards often used in diagnosing speech quality issues include ITU Standard P.861 and ITU Standard P.862. The speech quality tests prescribed in the above-mentioned standards require transmission of a test communication through a communication network and evaluation of the degradation within the test communication caused by its transmission through the communication network.

Evaluation of the test communication degradation involves comparison of the degraded test communication with an undegraded version of the test communication. However, before this comparison can be made, the degraded and undegraded test communications need to be properly aligned. It should be understood that degradation present in the received test communication may cause difficulty in this alignment process. In view of this difficulty, the standards recommend applying a cross-correlation function to the degraded and undegraded test communications to determine an amount of offset adjustment necessary to obtain the best alignment.

Application of the cross-correlation function to facilitate test communication alignment is expensive in terms of computational resources and time. Therefore, when performing speech quality testing on a number of different channels within a communication network, performance of the cross-correlation function to align the test signals can become a bottleneck in the testing process. To avoid the resource and time expense required to evaluate the cross-correlation function, the present invention provides a method and system for aligning the degraded and undegraded test communications without having to evaluate the cross-correlation function.

In the present invention, a pilot signal is prepended to a communication signal to form a test signal. In one embodiment, the communication signal is defined to serve as a test communication for speech quality testing of a communication network. The test signal is then transmitted through the communication network under test. Upon receipt of the test signal from the communication network, a temporal marker within the pilot signal portion of the test signal is identified. The communication signal within the test signal is known to begin at a specified time following the temporal marker. Therefore, using the temporal marker and the specified time, a beginning of the communication signal can be identified within the received test signal. Then, the identified beginning of the communication signal within the received test signal can be aligned with the beginning of the undegraded version of the communication signal.

The pilot signal used in conjunction with the present invention is defined to travel through the communication network with minimal distortion. For example, the pilot signal is resistant to distortion associated with processing through various encoders/decoders (CODECs) within the communication network. Also, the pilot signal is defined to be recognizable by the receiving device. In one embodiment, the receiving device applies a pilot signal recognition algorithm to all incoming signals. The pilot signal recognition algorithm is defined to detect the pilot signal when present within the incoming signals.

Figure 2A:
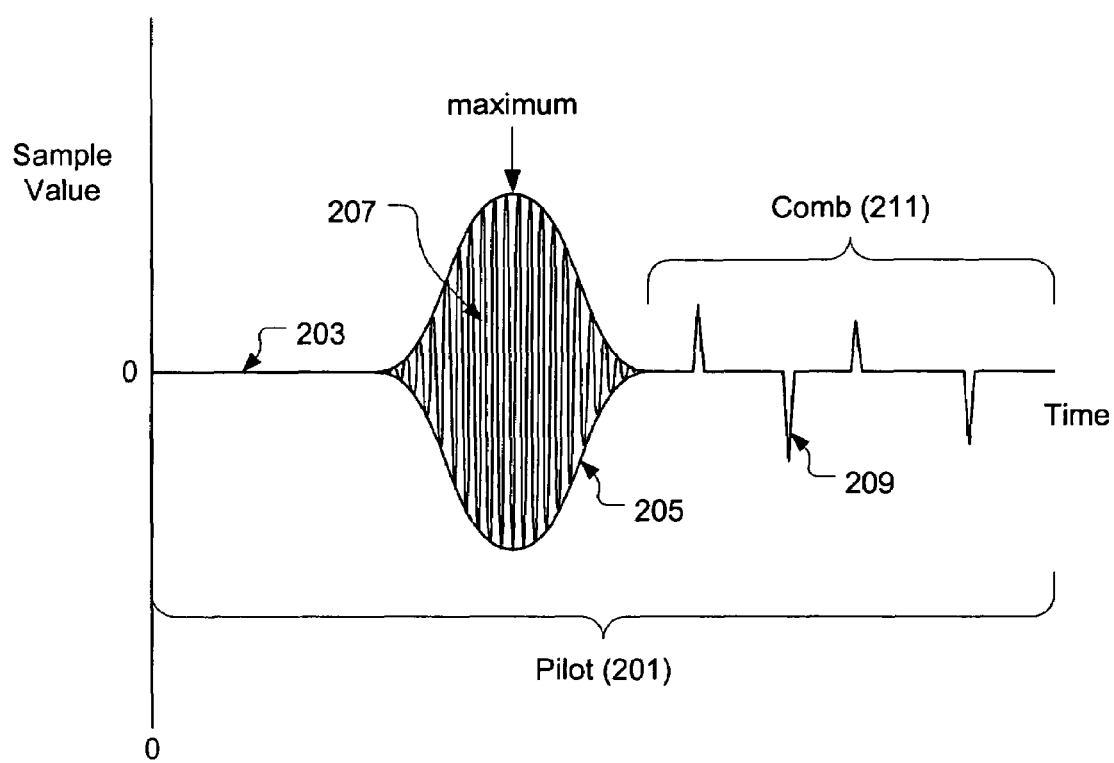
FIG. 2A is an illustration showing an exemplary representation of a pilot signal, in accordance with one embodiment of the present invention.

FIG. 2A is an illustration showing an exemplary representation of a pilot signal 201, in accordance with one embodiment of the present invention. The pilot signal 201 is defined to cover a temporal range including a silent portion 203, a Gaussian-shaped signal portion 205, and comb portion 211. The Gaussian-shaped signal portion 205 of the pilot signal 201 is filled by a sinusoidal signal 207. A maximum of the Gaussian-shaped signal 205 is capable of being detected as a temporal reference within the pilot signal 201. In some situations, the pilot signal recognition can be assisted using spike signals 209 present within the comb portion 211 of the pilot signal 201.

The sample value represented in the pilot signal 201 depiction of FIG. 2A, corresponds to sample values as used in digital telephony. More specifically, in digital telephony, an analog sound pattern is digitized by measuring and recording a digital value of the amplitude of the sound pattern about every 125 microseconds. Each measured digital value of the amplitude of the analog sound pattern is called a sample. In the case of a 125 microsecond sampling frequency, a digitized sound pattern signal includes a number of samples that are spaced apart at equal intervals of about 125 microseconds. Therefore, the digitized sound pattern includes about 8000 samples per second, regardless of how the corresponding analog sound pattern signal is defined.

It should be understood that the pilot signal 201 of FIG. 2A represents one example of an essentially unlimited number of pilot signals than can be used in conjunction with the present invention. For example, other pilot signals may represent variants of the pilot signal 201. Some variants of the pilot signal 201 may include multiple Gaussian-shaped signal portions separated by either a varying duration of silence or a varying duration of comb portion. Also, some variants of the pilot signal 201 may not include either the silence portion 203 or the comb portion 211. The point to be understood is that the pilot signal 201 can be defined in many different ways so long as the pilot signal can be transmitted through the communication network with minimal distortion, and so long as the pilot signal can be recognized through application of a suitable pilot signal recognition algorithm to incoming signals at the receiving device.

Figure 2B:
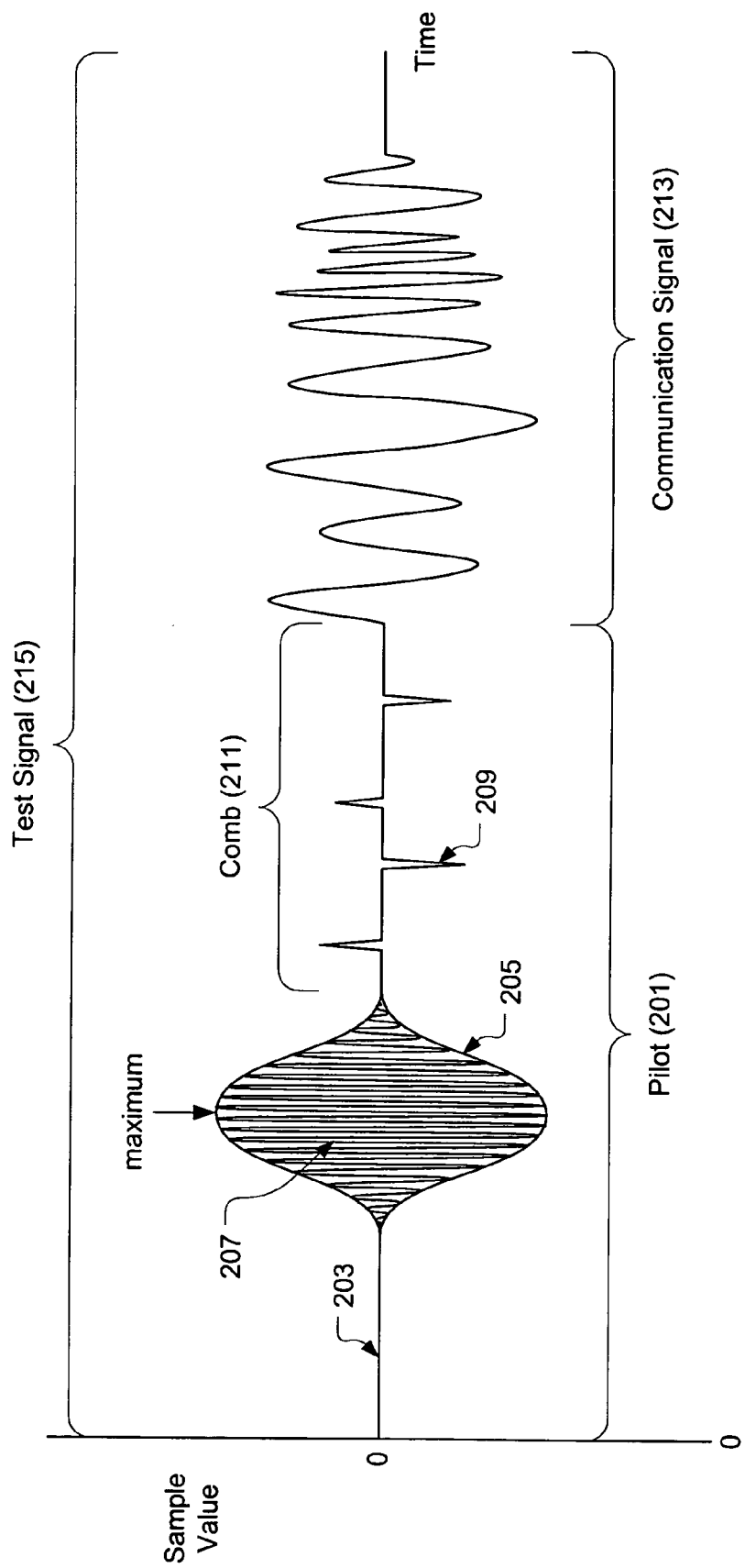
FIG. 2B is an illustration showing the exemplary pilot signal of FIG. 2A prepended to a communication signal, in accordance with one embodiment of the present invention.

FIG. 2B is an illustration showing the exemplary pilot signal 201 of FIG. 2A prepended to a communication signal 213, in accordance with one embodiment of the present invention. The combination of the pilot signal 201 and the communication signal 213 represents a test signal 215 to be transmitted through and received from the communication network under test. In one embodiment the communication signal 213 is defined as a voice pattern suitable for use in performing a speech quality test in accordance with ITU Standard P.861 and/or ITU Standard P.862.

Figure 3:
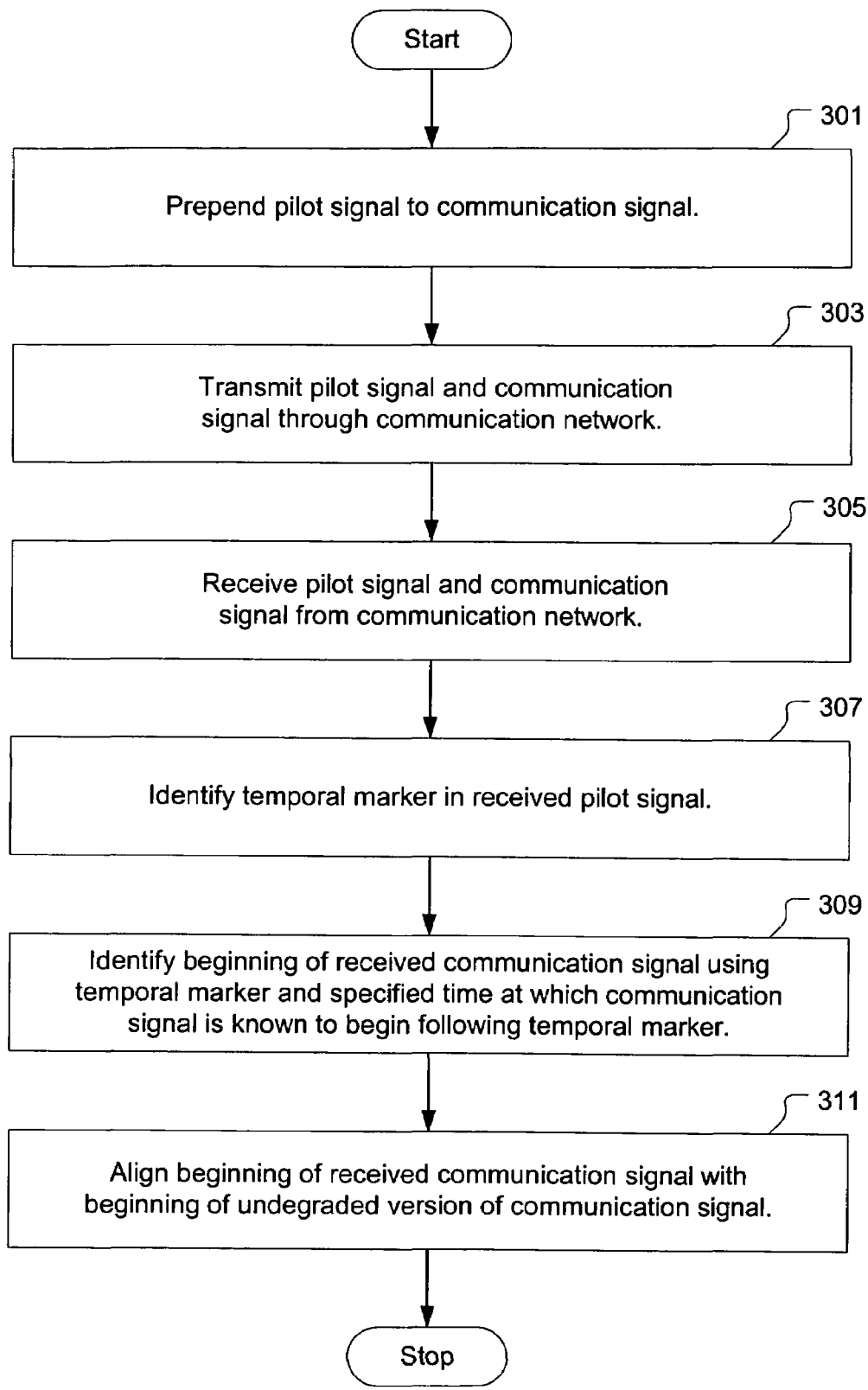
FIG. 3 is an illustration showing a method for aligning communication signals for testing of a communication network, in accordance with one embodiment of the present invention.

FIG. 3 is an illustration showing a method for aligning communication signals for testing of a communication network, in accordance with one embodiment of the present invention. The method includes an operation 301 for prepending a pilot signal to a communication signal. The pilot signal is defined to be transmitted through a voice channel of the communication network with minimum distortion. Also, the pilot signal is defined to be detectable upon receipt from the communication network. In one embodiment, the pilot signal includes a Gaussian-shaped signal that is filled by a sinusoidal signal. In this embodiment, a maximum of the Gaussian-shaped signal can be used as a temporal marker in the pilot signal received from the communication network. Additionally, in one embodiment the communication signal is defined as a voice pattern. The voice pattern can be defined for use in performing a speech quality test in accordance with any applicable standard, such as either International Telecommunication Union (ITU) Standard P.861 or ITU Standard P.862.

The method also includes an operation 303 for transmitting the pilot signal and communication signal through the communication network. In an operation 305, the pilot signal and communication signal are received from the communication network. In one embodiment, the pilot signal and communication signal are transmitted in the voice channel of the communication network and received from the voice channel of the communication network. It should be understood that either the pilot signal, the communication signal, or both the pilot signal and communication signal can be received from the communication network in a degraded state. In one embodiment, receiving the pilot signal and communication signal from the communication network includes an operation for monitoring signals received in the voice channel at the receiving device. This embodiment further includes an operation for applying a pilot signal recognition algorithm to the monitored signals to detect receipt of the pilot signal.

The method further includes an operation 307 for identifying a temporal marker in the received pilot signal. Through control of operation 301, the communication signal is known to begin at a specified time following the temporal marker. In an embodiment where the pilot signal and communication signal are digitized for transmission/receipt, the specified time following the temporal marker can be defined by a fixed number of digitized communication samples.

In an operation 309, a beginning of the received communication signal is identified using the temporal marker and the specified time at which the communication signal is known to begin following the temporal marker. With the beginning of the received communication signal having been identified, the method proceeds with an operation 311 for aligning the beginning of the received communication signal with a beginning of an undegraded version of the communication signal. It should be understood that alignment of the received communication signal with the undegraded version of the communication signal, as performed in operation 311, is performed without processing the received communication signal through a cross-correlation function. In one embodiment, once the received communication signal is aligned with the undegraded version of the communication signal, one or more speech quality tests involving comparison between the received communication signal and the undegraded version of the communication signal can be performed.

Figure 4:
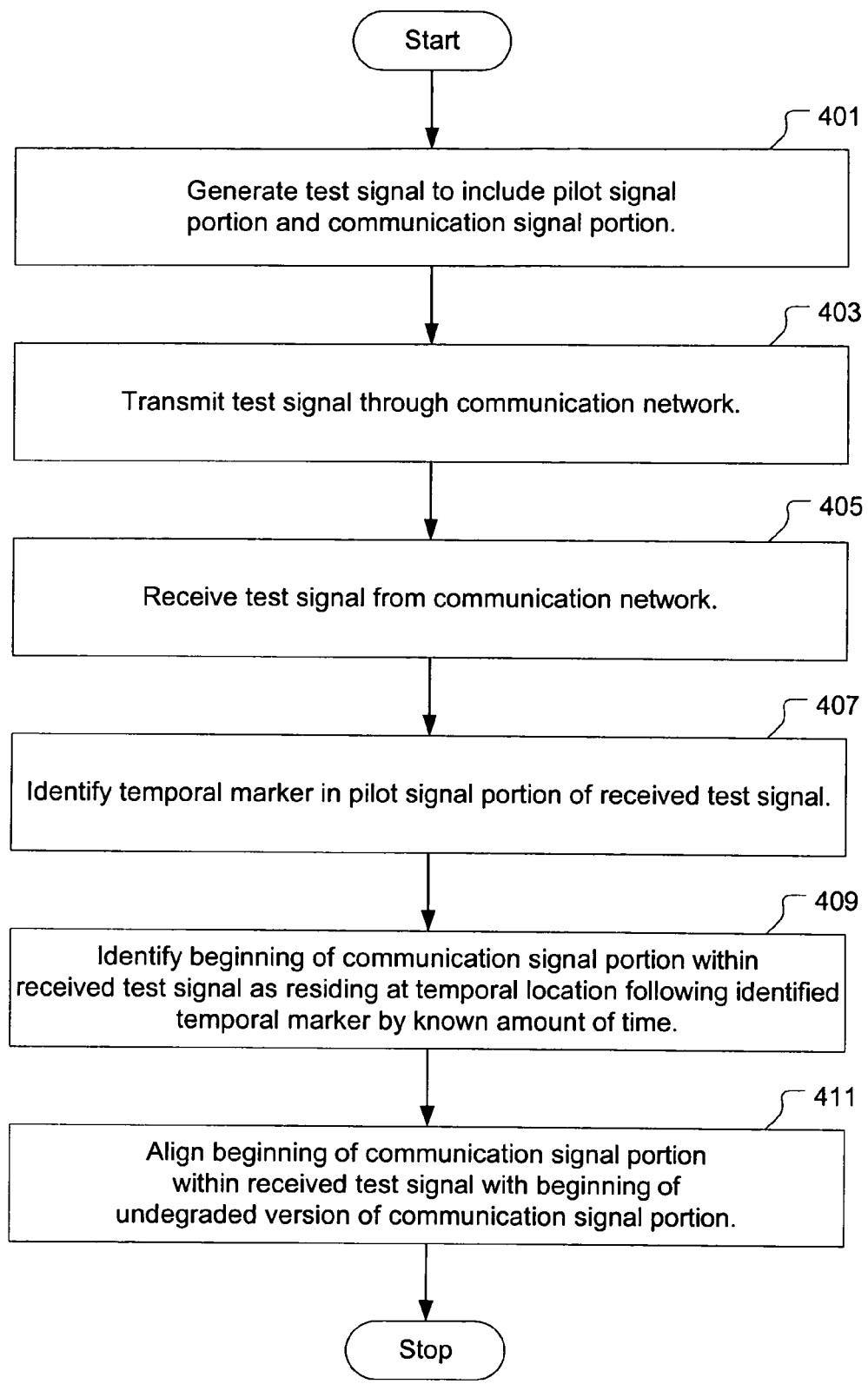
FIG. 4 is an illustration showing a method for aligning communication signals for testing of a communication network, in accordance with another embodiment of the present invention.

FIG. 4 is an illustration showing a method for aligning communication signals for testing of a communication network, in accordance with another embodiment of the present invention. The method includes an operation 401 for generating a test signal to include a pilot signal portion and a communication signal portion. The pilot signal portion precedes the communication signal portion within the test signal. Also, the pilot signal portion includes a temporal marker that precedes a beginning of the communication signal portion by a known amount of time. The pilot signal portion is defined to be transmitted through a voice channel of the communication network with minimum distortion. Also, the pilot signal portion is defined to be detectable upon receipt from the communication network. In one embodiment, the pilot signal portion includes a Gaussian-shaped signal that is filled by a sinusoidal signal. In this embodiment, a maximum of the Gaussian-shaped signal can be used as the temporal marker. Additionally, in one embodiment the communication signal portion is defined as a voice pattern. The voice pattern can be defined for use in performing a speech quality test in accordance with any applicable standard, such as either International Telecommunication Union (ITU) Standard P.861 or ITU Standard P.862.

The method also includes an operation 403 for transmitting the test signal through the communication network. In an operation 405 the test signal is received from the communication network. In one embodiment, the test signal is transmitted in the voice channel of the communication network and received from the voice channel of the communication network. It should be understood that either the pilot signal portion, the communication signal portion, or both the pilot signal portion and communication signal portion of the test signal can be received from the communication network in a degraded state. In one embodiment, receiving the test signal from the communication network includes an operation for monitoring signals received in the voice channel at a receiving device. Also in this embodiment, a pilot signal recognition algorithm is applied to the monitored signals to detect receipt of the pilot signal portion.

The method continues with an operation 407 for identifying the temporal marker in the pilot signal portion of the received test signal. In the embodiment where the temporal marker corresponds to the maximum of the Gaussian-shaped signal within the pilot signal portion, the operation 407 can include application of a pilot signal analysis algorithm to the received test signal to identify the maximum of the Gaussian-shaped signal within the pilot signal portion. In an operation 409, the beginning of the communication signal portion within the received test signal is identified as residing at a temporal location following the identified temporal marker by the known amount of time. In an embodiment where the test signal is digitized for transmission/receipt, the specified time following the temporal marker can be defined by a fixed number of digitized communication samples.

The method further includes an operation 411 for aligning the beginning of the communication signal portion within the received test signal with a beginning of an undegraded version of the communication signal portion. It should be understood that the alignment of operation 411 is performed without processing the received test signal through a cross-correlation function. In one embodiment, once the received communication signal portion is aligned with the undegraded version of the communication signal portion, one or more speech quality tests involving comparison between the received communication signal portion and the undegraded version of the communication signal portion can be performed.

Figure 5A:
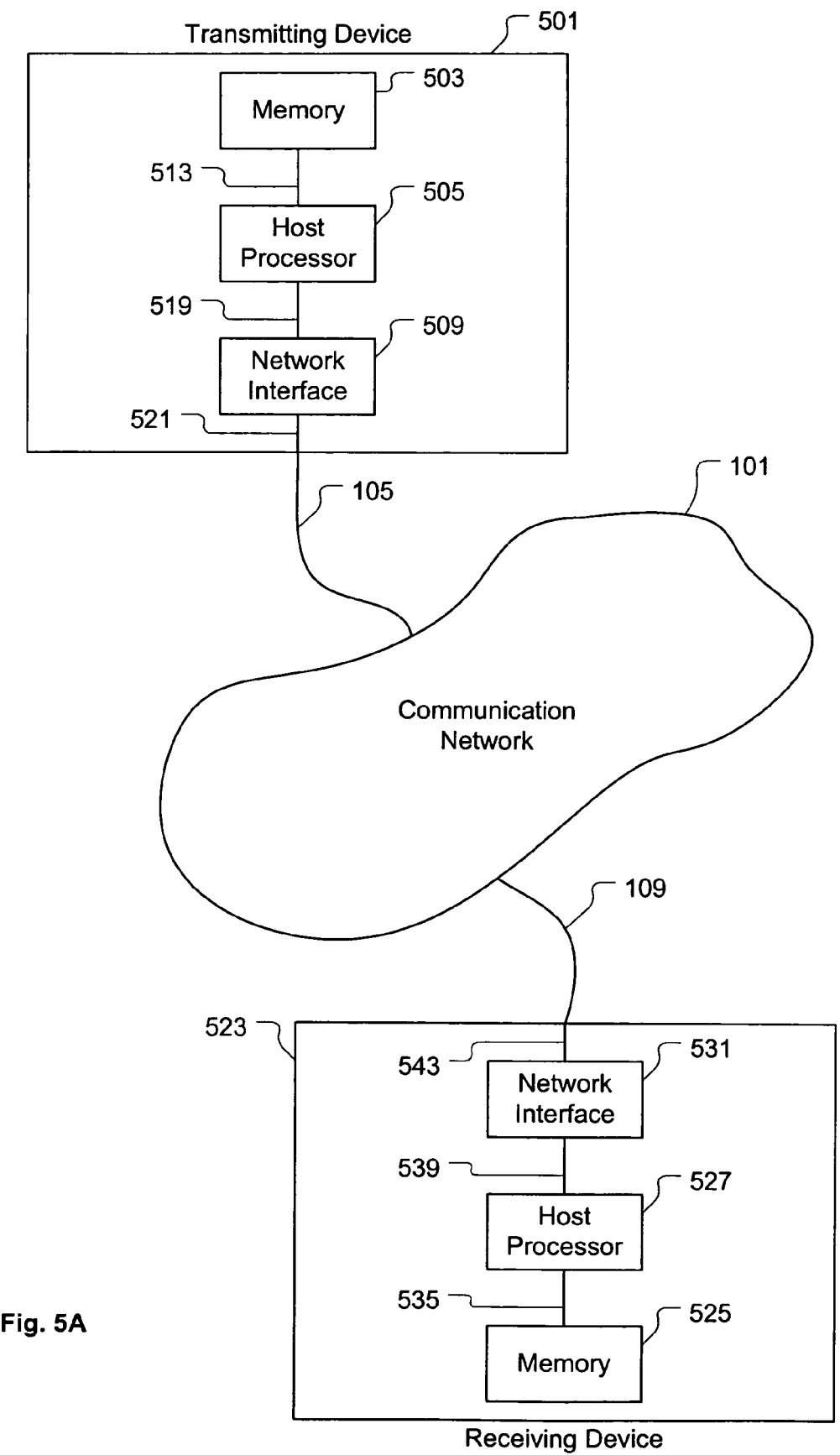
FIG. 5A is an illustration showing a system for testing a communication network, in accordance with one embodiment of the present invention.

FIG. 5A is an illustration showing a system for testing a communication network, in accordance with one embodiment of the present invention. The system includes a transmitting device 501 defined to communicate with a communication network 101 under test, through a connection 105. The system also includes a receiving device 523 defined to communicate with the communication network 101 under test, through a connection 109. The communication network 101 under test can be either a homogeneous network or a heterogeneous network. A homogeneous network is defined as a communication network that includes only analog devices or only digital devices. A heterogeneous network is defined as a communication network that includes a combination of analog devices and digital devices. In the heterogeneous network, voice channel signals may undergo a number of transformations between the analog and digital domains. The system as shown in FIG. 5A does not require knowledge of the configuration or operation that defines the communication network 101 under test.

The transmitting device 501 is defined to include a host processor 505, a memory 503, and a network interface 509. The host processor 505 is defined to communicate with the memory 503 and the network interface 509, through connections 513 and 519, respectively. The network interface 509 is defined to communicate through a connection 521 with the connection 105 to the communication network 101 under test.

The receiving device 523 is defined in a manner similar to the transmitting device 501. The receiving device 523 is defined to include a host processor 527, a memory 525, and a network interface 531. The host processor 527 is defined to communicate with the memory 525 and the network interface 531, through connections 535 and 539, respectively. The network interface 531 is defined to communicate through a connection 543 with the connection 109 to the communication network 101 under test.

In one embodiment, a testing application can be executed on the host processors 505 and 527 of the transmitting device 501 and receiving device 523, respectively. The testing application can be defined to direct performance of the communication network test. For example, when the testing application is ready to perform a speech quality test, the testing application can send an interrupt to the host processor 505 of the transmitting device 501 to initiate the speech quality test. In response to the interrupt, the host processor 505 will generate a test signal to include a pilot signal portion and a communication signal portion.

The test signal is generated such that the pilot signal portion is prepended to the communication signal portion. The pilot signal portion includes a temporal marker that precedes a beginning of the communication signal portion by a known amount of time. As previously discussed, the pilot signal portion is defined to be transmitted through a voice channel of the communication network 101 with minimum distortion. Also, the pilot signal portion is defined to be detectable upon receipt from the communication network 101. In one embodiment, the communication signal portion is defined as a voice pattern for use in performing a speech quality test in accordance with an applicable standard, such as either International Telecommunication Union (ITU) Standard P.861 or ITU Standard P.862.

In addition to generating the test signal, the host processor 505 will also direct transmission of the test signal from the transmitting device 501 to the receiving device 523, through a voice channel of the communication network 101 under test. It should be appreciated that establishment of a communication channel between the transmitting device 501 and the receiving device 523, through the communication network 101, is performed in accordance with normal operating condition technologies and protocols of the communication network 101.

The receiving device 523 is defined to receive signals in the voice channel from the communication network 101 through the network interface 531. During transmission through the communication network 101, any part of the test signal is subject to degradation. In one embodiment, the host processor 527 of the receiving device 523 is defined to monitor signals received in the voice channel and apply a pilot signal recognition algorithm to the monitored signals. Therefore, during the exemplary speech quality test, the host processor 527 of the receiving device 523 detects receipt of the pilot signal portion of the test signal at the receiving device 523.

Upon detecting receipt of the pilot signal portion at the receiving device 523, the host processor 527 functions to identify a temporal marker within the pilot signal portion of the received test signal. Because the communication signal portion follows the temporal marker within the pilot signal portion by a known amount time, the host processor 527 of the receiving device 523 is capable of identifying a beginning of the communication signal portion within the received test signal. The host processor 527 of the receiving device 523 then aligns the identified beginning of the communication signal portion within the received test signal with the beginning of an undegraded version of the communication signal portion, to facilitate performance of the speech quality test. It should be understood that the host processor 527 is capable of aligning the received communication signal portion with the undegraded version of the communication signal portion without processing any part of the received test signal through a cross-correlation function.

Figure 5B:
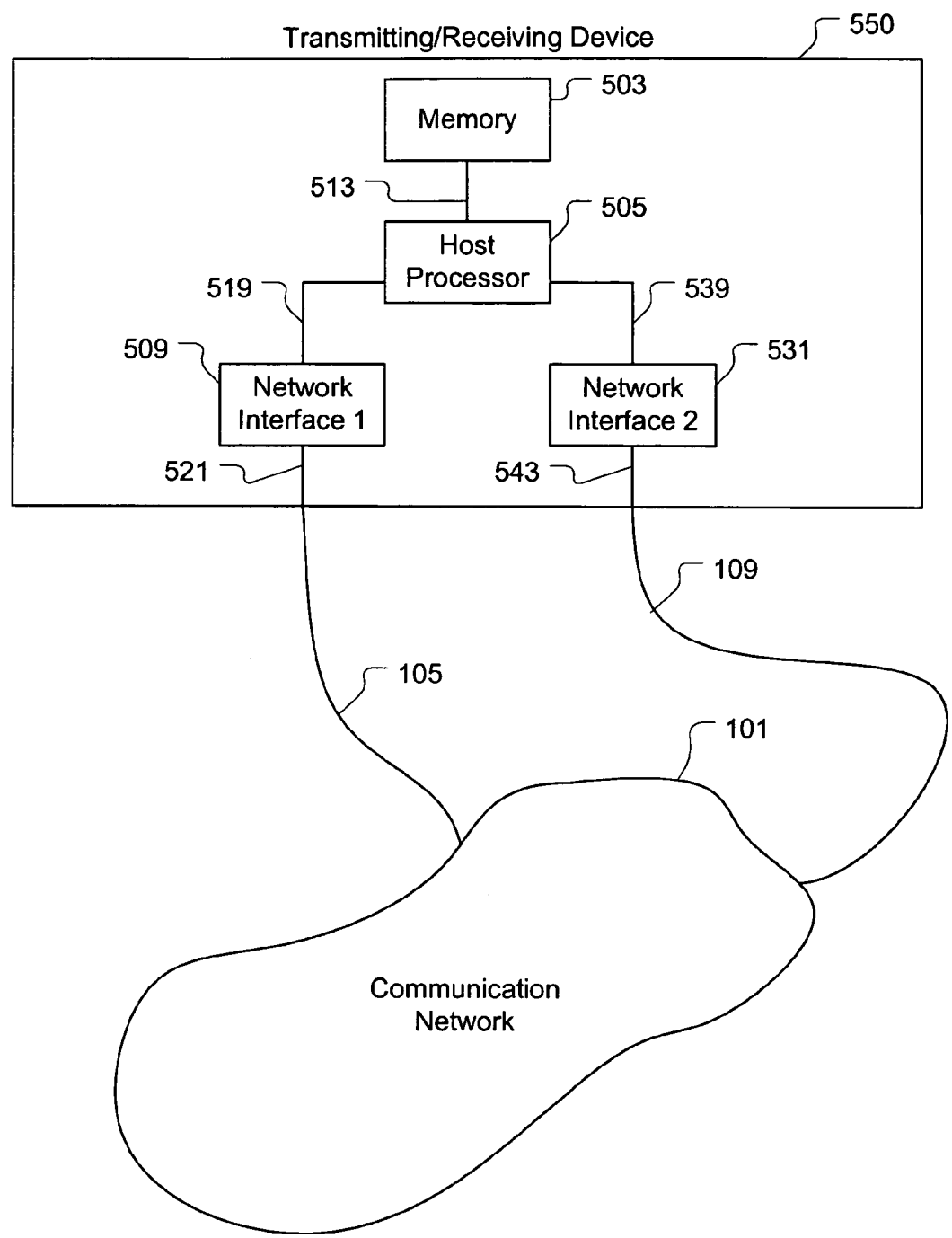
FIG. 5B is an illustration showing a system for testing a communication network, in accordance with another embodiment of the present invention.

FIG. 5B is an illustration showing a system for testing a communication network, in accordance with another embodiment of the present invention. The system of FIG. 5B is essentially equivalent to the system of FIG. 5A, with the exception that the transmitting device 501 and the receiving device 523 are combined into a single transmitting/receiving device 550. More specifically, the transmitting device 501 and the receiving device 523 are combined within the transmitting/receiving device 550 to share a common host processor 505 and a common memory 503. However, the transmitting/receiving device 550 is defined to include a first network interface 509 for transmission of the test signal, and a second network interface 531 for receipt of the test signal.

The host processor 505 is defined to communicate with both the first network interface 509 and the second network interface 531 through connections 519 and 539, respectively. The first network interface 509 communicates through a connection 521 with the connection 105 to the communication network 101. The second network interface 531 communicates through a connection 543 with the connection 109 to the communication network 101. With respect to performing communication network testing, particularly the exemplary speech quality testing, the system of FIG. 5B functions in the same manner as that previously described for the system of FIG. 5A. However, in the system of FIG. 5B, the test signal is transmitted through the first network interface 509 and received at the second network interface 531.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for aligning communication signals for testing of a communication network, comprising:
    prepending a pilot signal to a communication signal;
    transmitting the pilot signal and communication signal through a communication network;
    receiving the pilot signal and communication signal from the communication network;
    identifying a temporal marker in the received pilot signal, wherein the communication signal is known to begin at a specified time following the temporal marker;
    using the temporal marker and the specified time to identify a beginning of the received communication signal; and
    aligning the beginning of the received communication signal with a beginning of an undegraded version of the communication signal.

2. A method for aligning communication signals for testing of a communication network as recited in claim 1, wherein the pilot signal and communication signal are transmitted in a voice channel of the communication network and received from the voice channel of the communication network.

3. A method for aligning communication signals for testing of a communication network as recited in claim 1, wherein either the pilot signal, the communication signal, or both the pilot signal and communication signal is received in a degraded state.

4. A method for aligning communication signals for testing of a communication network as recited in claim 1, wherein aligning the beginning of the received communication signal with the beginning of the undegraded version of the communication signal is performed using the identified beginning of the received communication signal, and without processing the received communication signal through a cross-correlation function.

5. A method for aligning communication signals for testing of a communication network as recited in claim 1, wherein the pilot signal is defined to be transmitted through the communication network with minimum distortion, the pilot signal further defined to be detectable upon receipt.

6. A method for aligning communication signals for testing of a communication network as recited in claim 1, wherein the pilot signal includes a Gaussian-shaped signal that is filled by a sinusoidal signal, a maximum of the Gaussian-shaped signal capable of being identified as the temporal marker in the received pilot signal.

7. A method for aligning communication signals for testing of a communication network as recited in claim 1, wherein receiving the pilot signal and communication signal from the communication network includes,
    monitoring signals received in a voice channel at a receiving device; and
    applying a pilot signal recognition algorithm to the monitored signals to detect receipt of the pilot signal.

8. A method for aligning communication signals for testing of a communication network as recited in claim 1, wherein the specified time following the temporal marker is defined by a fixed number of digitized communication samples.

9. A method for aligning communication signals for testing of a communication network as recited in claim 1, wherein the communication signal is a voice pattern.

10. A method for aligning communication signals for testing of a communication network as recited in claim 9, wherein the voice pattern is to be used in performing a speech quality test in accordance with either International Telecommunication Union (ITU) Standard P.861 or ITU Standard P.862.

11. A method for aligning communication signals for testing of a communication network, comprising:
    generating a test signal to include a pilot signal portion and a communication signal portion, wherein the pilot signal portion precedes the communication signal portion within the test signal, the pilot signal portion including a temporal marker that precedes a beginning of the communication signal portion by a known amount of time;
    transmitting the test signal through a communication network;
    receiving the test signal from the communication network;
    identifying the temporal marker in the pilot signal portion of the received test signal;
    identifying the beginning of the communication signal portion within the received test signal as residing at a temporal location following the identified temporal marker by the known amount of time; and
    aligning the beginning of the communication signal portion within the received test signal with a beginning of an undegraded version of the communication signal portion.

12. A method for aligning communication signals for testing of a communication network as recited in claim 11, wherein aligning the beginning of the communication signal portion within the received test signal with the beginning of the undegraded version of the communication signal portion is performed using the identified beginning of the communication signal portion within the received test signal, and without processing the received test signal through a cross-correlation function.

13. A method for aligning communication signals for testing of a communication network as recited in claim 11, wherein the pilot signal portion is defined to be transmitted through the communication network with minimum distortion, the pilot signal portion further defined to be detectable upon receipt.

14. A method for aligning communication signals for testing of a communication network as recited in claim 11, wherein the pilot signal portion includes a Gaussian-shaped signal that is filled by a sinusoidal signal, a maximum of the Gaussian-shaped signal capable of being identified as the temporal marker in the received pilot signal portion.

15. A method for aligning communication signals for testing of a communication network as recited in claim 11, wherein receiving the test signal from the communication network includes,
   monitoring signals received in a voice channel at a receiving device; and
   applying a pilot signal recognition algorithm to the monitored signals to detect receipt of the pilot signal portion.

16. A method for aligning communication signals for testing of a communication network as recited in claim 11, wherein the communication signal is a voice pattern to be used in performing a speech quality test in accordance with either International Telecommunication Union (ITU) Standard P.861 or ITU Standard P.862.

17. A system for aligning communication signals for testing of a communication network, comprising:
   a transmitting device defined to prepend a pilot signal to a communication signal to generate a test signal, the transmitting device further defined to transmit the test signal through a communication network; and
   a receiving device defined to receive the test signal from the communication network, the receiving device further defined to identify a temporal marker within the pilot signal of the received test signal, wherein the communication signal is known to begin within the received test signal at a specified time following the temporal marker, the receiving device further defined to use the temporal marker and the specified time to identify a beginning of the communication signal within the received test signal and align the beginning of the communication signal within the received test signal with a beginning of an undegraded version of the communication signal.

18. A system for aligning communication signals for testing of a communication network as recited in claim 17, wherein the transmitting device and the receiving device are combined within a single device having a memory, host processor, a first network interface for transmission of the test signal, and a second network interface for receipt of the test signal.

19. A system for aligning communication signals for testing of a communication network as recited in claim 17, wherein the receiving device is defined to align the communication signal within the received test signal with the undegraded version of the communication signal without processing the received test signal through a cross-correlation function.

20. A system for aligning communication signals for testing of a communication network as recited in claim 17, wherein the receiving device is further defined to monitoring signals received in a voice channel from the communication network and apply a pilot signal recognition algorithm to the monitored signals to detect receipt of the pilot signal with the test signal.

* * * * *